United States Patent
Koseoglu et al.

(10) Patent No.: US 10,787,618 B2
(45) Date of Patent: Sep. 29, 2020

(54) MODIFIED USY-ZEOLITE CATALYST FOR REFORMING HYDROCARBONS

(71) Applicants: SAUDI ARABIAN OIL COMPANY, Dhahran (SA); JGC CATALYST AND CHEMICALS LTD., Kanagawa (JP)

(72) Inventors: Omer Refa Koseoglu, Dhahran (SA); Robert Peter Hodgkins, Dhahran (SA); Ali H. Alshareef, Dhahran (SA); Koji Uchida, Kanagawa (JP); Mitsunori Watabe, Kanagawa (JP); Kenji Nita, Kanagawa (JP)

(73) Assignees: SAUDI ARABIAN OIL COMPANY, Dhahran (SA); JGC CATALYST AND CHEMICALS, LTD., Kawasaki, Kanagawa (JP)

( * ) Notice: Subject to any disclaimer, the term of this patent is extended or adjusted under 35 U.S.C. 154(b) by 395 days.

(21) Appl. No.: 15/877,788

(22) Filed: Jan. 23, 2018

(65) Prior Publication Data

US 2019/0224653 A1    Jul. 25, 2019

(51) Int. Cl.
| | |
|---|---|
| *C10G 35/06* | (2006.01) |
| *B01J 29/08* | (2006.01) |
| *B01J 23/42* | (2006.01) |
| *B01J 35/10* | (2006.01) |
| *B01J 37/02* | (2006.01) |
| *B01J 21/04* | (2006.01) |
| *B01J 23/40* | (2006.01) |
| *B01J 29/12* | (2006.01) |
| *B01J 21/12* | (2006.01) |
| *C10G 35/085* | (2006.01) |

(52) U.S. Cl.
CPC ............. *C10G 35/065* (2013.01); *B01J 21/04* (2013.01); *B01J 21/12* (2013.01); *B01J 23/40* (2013.01); *B01J 23/42* (2013.01); *B01J 29/084* (2013.01); *B01J 29/088* (2013.01); *B01J 29/126* (2013.01); *B01J 35/1019* (2013.01); *B01J 35/1038* (2013.01); *B01J 35/1042* (2013.01); *B01J 37/0201* (2013.01); *B01J 37/0211* (2013.01); *C10G 35/085* (2013.01); *B01J 2229/183* (2013.01); *B01J 2229/37* (2013.01); *C10G 2300/1044* (2013.01); *C10G 2400/02* (2013.01)

(58) Field of Classification Search
CPC .. C10G 35/065; C10G 35/085; B01J 2029/81; B01J 29/088; B01J 29/126
See application file for complete search history.

(56) References Cited

U.S. PATENT DOCUMENTS

| | | |
|---|---|---|
| 3,523,914 A | 8/1970 | Milsche et al. |
| 4,698,322 A | 10/1987 | Santilli et al. |
| 5,057,203 A | 10/1991 | Chu et al. |
| 5,271,761 A | 12/1993 | Skeels et al. |
| 5,411,724 A | 5/1995 | Beyer et al. |
| 5,414,175 A * | 5/1995 | Cook ............... C10G 35/085 208/138 |
| 5,690,810 A | 11/1997 | Lawrence et al. |
| 7,700,005 B2 | 4/2010 | Inui et al. |
| 8,008,226 B2 | 8/2011 | Inui et al. |
| 9,221,036 B2 | 12/2015 | Koseoglu et al. |
| 9,499,403 B2 | 11/2016 | Al-Muhaish et al. |
| 9,512,371 B2 | 12/2016 | Abe et al. |
| 2011/0132804 A1 | 6/2011 | Stevenson et al. |
| 2012/0085681 A1 | 4/2012 | Abe et al. |
| 2013/0175202 A1 | 7/2013 | Koseoglu et al. |
| 2015/0375218 A1 | 12/2015 | Koseoglu et al. |

FOREIGN PATENT DOCUMENTS

| | | |
|---|---|---|
| EP | 0319538 A1 | 6/1989 |
| GB | 1255544 A | 12/1971 |
| WO | 8801254 | 2/1988 |

OTHER PUBLICATIONS

International Search Report from corresponding PCT Application No. PCT/US2018/064001 dated Feb. 18, 2019.

* cited by examiner

*Primary Examiner* — Renee Robinson
(74) *Attorney, Agent, or Firm* — Abelman, Frayne and Schwab

(57) ABSTRACT

The invention relates to a reforming catalyst. The reforming catalyst comprises a reforming metal, such as Pt, a support, such as an alumina support, and a USY zeolite, which has had part of its aluminum framework substituted with Zr and Ti. The amount of USY zeolite does not exceed 5 wt %, and most preferably, contains 2-3 wt % USY zeolite.

21 Claims, No Drawings

MODIFIED USY-ZEOLITE CATALYST FOR REFORMING HYDROCARBONS

FIELD OF THE INVENTION

The present invention relates to a catalyst for catalytic reforming of hydrocarbon oil containing a framework-substituted zeolite-Y in which zirconium atoms and/or hafnium atoms and/or titanium atoms form a part of a framework of an ultra-stable Y-type zeolite.

BACKGROUND AND PRIOR ART

Catalytic reforming is a major conversion process in petroleum refinery and petrochemical industries. The reforming process is a catalytic process which converts low octane naphtha that have been, e.g., distilled from crude oil, into higher octane reformate used in gasoline blending and aromatic rich reformates used for aromatic production. Basically, the process re-arranges or re-structures the hydrocarbon molecules in naphtha feedstocks and breaks some of the molecules into smaller molecules. Naphtha feeds to catalytic reforming include heavy straight run naphtha. It transforms low octane naphtha into high-octane motor gasoline blending stock and aromatics rich in benzene, toluene, and xylene with hydrogen and liquefied petroleum gas as a byproduct. With the fast growing demand in aromatics and demand of high-octane numbers, catalytic reforming is likely to remain one of the most important unit processes in the petroleum and petrochemical industry. There are various commercial catalytic reforming processes which will be well known to the skilled artisan.

Given the importance of preparing useful products from crude oil, it is not surprising that there is a substantial literature on catalytic reforming processes.

U.S. Pat. No. 4,698,322 to Santilli teaches a reformation catalyst containing (i) Pt, (ii) type L zeolite, and (iii) a "promoter" which can be Fe, Co, or Ti. The ratio of Pt to promoter is less than 10:1. This "promoter" is not inserted into the zeolite framework which, in any event, differs from USY zeolite. No binder is disclosed either.

U.S. Pat. No. 5,271,761 to Skeels teaches zeolite Y molecular sieves. The artisan recognizes that, while USY and zeolite Y both have an FAU framework, they differ in composition and properties. The '761 Patent also describes mole fractions of $TiO_2$, $AlO_2$, and $SiO_2$, as well as Si/Ti ratios and (Si+Al)/Ti ratios, which are not within the ranges of those of the invention described herein.

Also see U.S. Pat. No. 5,690,810 to Lawrence, et al., teaching reforming processes using solid acids. Group III or Group IV members of the periodic table, and Group VIII metal deposits. Also see U.S. Pat. No. 9,499,403 to Al-Muhaish, et al., U.S. Pat. Nos. 8,008,226 and 7,700,005 to Inui et al.

U.S. Pat. No. 9,512,371 describes incorporating Ti into FAU zeolites, followed by their use as hydrocracking catalysts. The weight % ratio of Al/Si ranges from 0.14-0.35, which is well outside of the range of the present invention.

In a sense, catalytic hydrocracking may be viewed as the "opposite" of reforming processes, because in the former, large molecules are broken ("cracked") into smaller ones, while reformation converts the molecules by, e.g., dehydrogenation, isomerization, alkylation, and cracking reactions converting starting materials into high octane containing molecules. Again, the literature on hydrocracking catalysts is enormous, and the inventors wish to draw attention to U.S. Pat. No. 9,221,036, incorporated by reference in its entirety.

The '036 patent teaches, inter alia, a hydrocracking catalyst in which a USY framework has been substituted, in part, by one or more of zirconium, titanium, and hafnium. In these catalysts, the metal (Ti, Zr, and/or Hf), substitutes for part of the aluminum in the aluminum/silica framework, and essentially become part of the framework. Processes for making these catalysts and their use, are all described in the '036 patent. Examples 1 and 2, infra, are in fact taken from this Patent.

Zeolite based catalysts provide sufficient acidity to function in cracking, which are desirable in hydrocracking. In contrast, these reactions are very undesirable in reforming reactions, so a goal of developing any new reforming catalyst is a reduction of acidity in the catalytic composition.

Further, characteristic metals which are used in hydrocracking are Ni, Mo, and W, alone or preferably, in combination. Such metals are avoided in reforming catalysts, which are characterized by the presence of noble metals. A further fundamental difference is the temperature at which hydrocracking and reforming reactions operate, with the latter type of reaction requiring temperatures of 500° C. or more, well above those used in hydrocracking.

Given the different aims, and reagents, used in reforming processes and hydrocracking, it is surprising that a hydrocracking catalyst can be modified to become a reforming catalyst. Yet, this is the subject of the invention, which is elaborated upon in the disclosure which follows.

DETAILED DESCRIPTION OF PREFERRED EMBODIMENTS

The invention includes a catalyst useful in reforming processes, wherein an ultra stable Y ("USY" hereafter) zeolite is framework substituted to incorporate one or more of zirconium, titanium, and hafnium into its framework, and also has impregnated therein a reforming process metal, such as Pt, Rh, or Pd. Optionally, the reforming catalyst can include or comprise a metal such as V, Zn, Ga, Li, Ca, Mg, or a rare earth metal.

The USY zeolite, base component of the catalysts of the invention contains from 0.1 to 5 mass % of one or more of Zr, Ti, and Hf, as calculated on their oxide basis. The reforming metal is present in an amount from 0.01 to 1 wt %, preferably from 0.1 to 0.4 wt % of the resulting catalyst composition. The amounts of the individual materials supplying Zr, Ti, and Hf is less than 0.1 wt %, but when combined, the total is at least 0.1 wt %.

In toto, the catalytic compositions comprise a binder, e.g., an alumina binder, a USY zeolite, and the aforementioned metals. The amount of USY-zeolite should not exceed 50 wt %, and is preferably 1-10, more preferably 1-5, and most preferably 2-3 wt % of the total composition.

EXAMPLES

Example 1

Manufacture of an Ultra-Stable Y Zeolite

First, 50.0 kg of a NaY zeolite (hereinafter, also referred to as "NaY") having a $SiO_2/Al_2O_3$ molar ratio of 5.2, a unit cell dimension (UD) of 2.466 nm, a specific surface area (SA) of 720 m$^2$/g, and a $Na_2O$ content of 13.0% by mass was suspended in 500 liter (hereinafter, also expressed as "L") of water having a temperature of 60° C. Then, 14.0 kg of ammonium sulfate was added thereto. The resulting suspension was stirred at 70° C. for 1 hour and filtered. The resulting solid was washed with water. Then the solid was washed with an ammonium sulfate solution of 14.0 kg of ammonium sulfate dissolved in 500 L of water having a temperature of 60° C., washed with 500 L of water having a temperature of 60° C., dried at 130° C. for 20 hours, thereby affording about 45 kg of a Y zeolite ($NH_4^{65}Y$) in which 65% of sodium (Na) contained in NaY was ion-exchanged with ammonium ion ($NH_{41}$). The content of $Na_2O$ in $NH_4^{65}Y$ was 4.5% by mass.

$NH_4^{65}Y$ 40 kg was fired in a saturated water vapor atmosphere at 670° C. for 1 hour to form a hydrogen-Y zeolite (HY). HY was suspended in 400 L of water having a temperature of 60° C. Then 49.0 kg of ammonium sulfate was added thereto. The resulting mixture was stirred at 90° C. for 1 hour and washed with 200 L of water having a temperature of 60° C. The mixture was then dried at 130° C. for 20 hours, thereby affording about 37 kg of a Y zeolite ($NH_4^{95}Y$) in which 95% of Na contained in the initial NaY was ion-exchanged with $NH_4$. $NH_4^{95}Y$ 33.03 kg was fired in a saturated water vapor atmosphere at 650° C., for 1 hour, thereby affording about 15 kg of a ultra stable Y zeolite (hereinafter, also referred to as "USY (a)") having a $SiO_2/Al_2O_3$ molar ratio of 5.2 and a $Na_2O$ content of 0.60% by mass.

Next, 26.0 kg of this (a) was suspended in 260 L of water having a temperature of 60° C. After 61.0 kg of 25% sulfuric acid by mass was gradually added to the suspension, the suspension was stirred at 70' C. for 1 hour. The suspension was filtered. The resulting solid was washed with 260 liter of deionized water having a temperature of 60° C. and dried 130° C. for 20 hours, thereby affording a ultra stable Y-type zeolite (hereinafter, also referred to as "USY (b)").

USY (b) was fired at 600° C. for 1 hour, thereby affording about 17 kg of ultra stable Y-type zeolite (hereinafter, also referred to as "USY (c)").

Example 2

1 kg of USY (c) obtained in Example 1 was suspended in 10 L of water at 25° C., and the pH of the solution was adjusted to 1.6 by sulfuric acid of 25% by mass. Zirconium sulfate of 18% by mass (86 g) and titanyl sulfate of 33% by mass (60 g) were added and mixed, and the suspension was stirred at room temperature for 3 hours. Then, the pH was adjusted to 7.2 by adding 1.5% by mass aqueous ammonia, and the suspension was stirred at room temperature for 1 hour and then filtered. The product obtained was washed with 10 L of water and dried at 130° C., for 20 hours to obtain about 1 kg of a zirconium/titanium-substituted type zeolite (hereinafter referred to as "USY (E)"). Analysis showed the USY contained 0.8% by weight of $TiO_2$, and a total of 1.39% by weight of $TiO_2$ and $ZrO_2$.

Example 3

This example presents a catalyst prepared in accordance with the invention.

A catalyst support was prepared by combining 95 wt % of an alumina binder as a support, and 5 wt % of a framework inserted Ti—Zr-USY prepared in accordance with Example 2, supra. This support was then impregnated with Pt, by mixing 600 g of the support with a solution of tetra-amine Pt containing 1.9 wt % Pt. (This solution was prepared by dissolving 63 g of tetra-amine platinum in water). This served to impregnate the catalyst support with Pt. The product was then air dried at 120° C. for one hour, and calcined at 400° C. for one hour. Analysis showed that 0.2 wt % Pt had been impregnated in the support.

Though not discussed in this Example, the mixture as prepared may be mixed with a catalyst support (e.g., alumina, silica, or mixes thereof, or any catalyst support known to the art) and then extruded, at room temperature prior to drying and calcination. The mixing and extrusion will be familiar to the skilled artisan, as well as by way of review of the '036 Patent, supra.

Example 4

The catalyst prepared in Example 3, was used in a pilot study, which took place over sixteen (16) days. The conditions were changed, so as to determine the impact of various parameters. The pilot plant was operated at 510° C., at a pressure range of 6-8 bars, a liquid hourly space velocity range of 1.0-1.5 $h^{-1}$ and a hydrogen to hydrocarbon ratio range of 3.5-5.0. Table 1 shows the composition of the test feedstock. Table 2 refers to the final results. "Feed" refers, of course, to the composition of the feedstock. "Commercial" refers to a commercially available catalyst compared to the catalyst of Example 3.

TABLE 1

Feedstock properties

| Property (unit) | Unit | Value |
| --- | --- | --- |
| Density @ 15° C. | Kg/L | 0.7374 |
| API Gravity | ° | 60.2 |
| Distillation | | |
| IBP | ° C. | 78 |
| 10 W % | ° C. | 100 |
| 30 W % | ° C. | 112 |
| 50 W % | ° C. | 125 |
| 70 W % | ° C. | 139 |
| 90 W % | ° C. | 156 |
| FBP | ° C. | 173 |
| Paraffins | W % | 70.8 |
| Olefins | W % | 1.6 |
| Naphthenes | W % | 14.5 |
| Aromatics | W % | 13.0 |
| Sulfur | Ppmw | 0.3 |

TABLE 2

Process performance.

| Composition/Property | Unit | Feed | Commercial | EXAMPLE 3 |
| --- | --- | --- | --- | --- |
| Paraffin | W % | 36.8 | 9.9 | 10.0 |
| I-Paraffins | W % | 34.0 | 18.4 | 16.1 |
| Aromatics | W % | 13.0 | 68.3 | 68.3 |
| Naphtenes | W % | 14.5 | 1.0 | 1.3 |
| Olefins | W % | 1.6 | 2.4 | 4.3 |
| Calculated RON | | 38.9 | 97.4 | 97.1 |
| Avg MW | Kg/Kmol | 109.6 | 97.3 | 97.1 |
| Mass Balance | W % | | 93 | 101 |
| Liquid Yield | W % | | 74 | 68 |
| H2 Yield | W % | | 0.65 | 0.52 |

The foregoing examples set forth embodiments of the invention, which include a reforming catalyst, a process for making the reforming catalyst, and its use.

The reforming catalyst of the invention is a composition comprising an ultra stable ("US") Y type zeolite, with a framework in which part of the aluminum has been substituted with Zr and Ti, and to which a reforming metal has been added. The reforming metal is preferably added in an amount of from 0.01-1.0 wt % of the total weight of catalyst. "Reforming metals" as used herein includes the noble metals, i.e., Ru, Rh, Pd, Ag, Os, Ir, Pt, and Au, with Pt and Pd being preferred. Optionally, the framework of the zeolite may contain one or more of V, Zn, Ga, Li, Ca, Mg, and the rare earth elements.

The actual amount of USY-zeolite in the catalyst is less than 50% by weight, but is preferably as low as 1-10 wt %, preferably 1-5 wt %, most preferably 2-3 wt %. As in the '036 Patent, the Zr, Ti, Hf and other optional metals used, may be present in amounts ranging from 0.1-5% by mass of the zeolite base component. Other characteristics of the zeolite of the reforming catalyst include a crystal lattice constant of from 2.425 to 2.450 nm, preferably 2.430-2.450 nm, a specific surface area of from 600 $m^2/g$ to 900 $m^2/g$, and a molar ratio of $SiO_2$ to $Al_2O_3$, generally ranging from 5:1 to 100:1 and preferably from 20:1 to 100:1. These reforming catalysts preferably have a specific surface area of from 200 to 450 $m^2/g$, and a pore volume of from 0.4-1.00 ml/g.

The catalytic composition of the zeolite component, in preferred embodiments, contains from 0.25 to 1.25 wt % of $TiO_2$. Preferably, it contains from 0.75 to 1.0 wt % $TiO_2$, and most preferably, 0.8 wt % $TiO_2$ (which corresponds to 0.01 mol % of $TiO_2$).

The catalysts of the invention are made, essentially, by using the processes described in U.S. Pat. No. 9,221,036, incorporated by reference supra, via, the USY zeolite of Example 2 is placed in suspension, preferably to form a suspension having a liquid/solid mass ratio of from 5 to 15, after which an acid is preferably added to bring the suspension to a pH of from 1 to 2, after which Zr and Ti are added and mixed, followed by neutralization. The resulting material is combined with a binder, such as an alumina binder, and impregnated with a noble metal by adding a solution of the noble metal thereto, followed by drying and calcining.

In use, the reforming catalyst of the invention is contacted to a hydrocarbon feedstock having a boiling point in the range of 36-250° C., at a reaction temperature of from 400° C. to 600° C., preferably 430° C.-600° C., and most preferably 430-550° C., and a pressure of from 1 bar to 50 bars, an LHSV of from 0.5 to 5 $h^{-1}$, and a hydrogen to hydrocarbon feed ratio of from 1:1 to 50:1, preferably 1:1 to 30:1. Various methods may be used, such as a fixed bed reactor, a catalyst replacement reactor, a semi-regenerative fixed bed reactor, a cyclic fixed bed reformer, or a continuous reformer.

Other features of the invention will be clear to the skilled artisan and need not be reiterated here.

The terms and expression which have been employed are used as terms of description and not of limitation, and there is no intention in the use of such terms and expression of excluding any equivalents of the features shown and described or portions thereof, it being recognized that various modifications are possible within the scope of the invention.

We claim:

1. A method for reforming a hydrocarbon feedstock, comprising contacting said hydrocarbon feedstock with a reforming catalyst, said reforming catalyst comprising a reforming metal carried on a support containing an ultrastable (US) Y zeolite in which a portion of aluminum atoms of the framework of said USY zeolite has been substituted with at least one of zirconium, titanium and hafnium atoms, at a reaction temperature of from 430° C. to 600° C., a pressure of from 1 to 50 bars, an LHSV of from 0.5 to 1.5 $h^{-1}$, at a hydrogen to feedstock ratio of from 1:1 to 50:1 liters, wherein said reforming catalyst has been prepared by forming a suspension of a USY zeolite in which a portion of aluminum atoms in the framework of said USY zeolite has been substituted with one or more of zirconium, titanium, and hafnium atoms, a binder, and a reforming metal.

2. The method of claim 1, wherein said USY zeolite contains from 0.1-5 mass % of zirconium and titanium atoms as calculated on an oxide basis.

3. The method of claim 1, wherein said support further comprises alumina or & silica-alumina.

4. The method of claim 1, wherein said USY zeolite has:
(a) a crystal lattice constant of from 2.425 to 2.450 nm;
(b) a specific surface area of from 600 to 900 $m^2/g$, and;
(c) a molar ratio of $SiO_2$ to $Al_2O_3$ of from 5 to 100.

5. The method of claim 1, wherein said reforming catalyst has a specific surface area of 200-450 $m^2/g$ and a pore volume of from 0.4-1.0 ml/g.

6. The method of claim 1, wherein said reforming catalyst comprises from 0.01-1.0 wt % of the reforming metal.

7. The method of claim 6, wherein said reforming metal is a noble metal.

8. The method of claim 7, wherein said noble metal is Ru, Rh, Pd, As, Os, Ir, Pt or Au.

9. The method of claim 8, wherein said noble metal is Pt.

10. The method of claim 1, wherein said reforming catalyst contains less than 50 wt % of USY zeolite.

11. The method of claim 10, wherein said reforming catalyst contains from 1-10 wt % of USY zeolite.

12. The method of claim 11, wherein said reforming catalyst contains from 1-5 wt % of USY zeolite.

13. The method of claim 1, wherein said USY zeolite comprises V, Zn, Ga, Li, Ca, or Mg.

14. The method of claim 1, wherein said reaction temperature is from 430° C. to 500° C.

15. The method of claim 1, wherein said hydrogen to feedstock ratio ranges from 1:1 to 30:1.

16. The method of claim 1, comprising reforming said feedstock in a fixed bed reactor.

17. The method of claim 16, wherein said fixed bed reactor is a semi-regenerative fixed bed reactor.

18. The method of claim 1, comprising reforming said hydrocarbon feedstock in a cyclic fixed bed reformer.

19. The method of claim 1, comprising reforming said hydrocarbon feedstock in a continuous reformer.

20. The method of claim 1, comprising reforming said hydrocarbon feedstock said catalyst in a hydrocarbon feedstock replacement reactor.

21. The method of claim 1, wherein said hydrocarbon feedstock has a boiling point of from 36-250° C.

* * * * *

UNITED STATES PATENT AND TRADEMARK OFFICE
CERTIFICATE OF CORRECTION

Page 1 of 1

PATENT NO. : 10,787,618 B2
APPLICATION NO. : 15/877788
DATED : September 29, 2020
INVENTOR(S) : Omer Refa Koseoglu et al.

It is certified that error appears in the above-identified patent and that said Letters Patent is hereby corrected as shown below:

In the Claims

Claim 1, Column 6, Lines 6-7, change "pressure of from 1 to 50 bars, an LHSV of from 0.5 to 1.5 h-1," to -- pressure of from 1 to 50 bars, an LHSV of from 0.5 to 5 h-1 --.

Claim 8, Column 6, Line 30, change "The method of claim 34, wherein said noble metal is Ru, Rh, Pd, As, Os, Ir, Pt or Au." to -- The method of claim 34, wherein said noble metal is Ru, Rh, Pd, Ag, Os, Ir, Pt or Au. --.

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*